United States Patent
Sonohara (10) Patent No.: US 7,880,359 B2
(45) Date of Patent: Feb. 1, 2011

(54) COIL MEMBER, MOTOR AND MANUFACTURING METHOD FOR COIL MEMBER

(75) Inventor: Hiroyuki Sonohara, Nagano (JP)

(73) Assignee: Nidec Sankyo Corporation (JP)

( * ) Notice: Subject to any disclaimer, the term of this patent is extended or adjusted under 35 U.S.C. 154(b) by 250 days.

(21) Appl. No.: 12/059,301

(22) Filed: Mar. 31, 2008

(65) Prior Publication Data
US 2008/0238239 A1 Oct. 2, 2008

(30) Foreign Application Priority Data
Mar. 30, 2007 (JP) ............................. 2007-094897
Mar. 11, 2008 (JP) ............................. 2008-061658

(51) Int. Cl.
*H02K 1/12* (2006.01)
(52) U.S. Cl. ................. 310/194; 310/49.13; 310/49.17; 310/257
(58) Field of Classification Search ................ 310/164, 310/194, 257, 49.13, 49.14, 49.17
See application file for complete search history.

(56) References Cited

U.S. PATENT DOCUMENTS
4,714,850 A * 12/1987 Akiba et al. ............. 310/49.14

FOREIGN PATENT DOCUMENTS
| JP | 1-189207 | 7/1989 |
| JP | 2002-34227 | 1/2002 |
| JP | 2003-347117 | 12/2003 |
| JP | 2005-45944 | 2/2005 |

* cited by examiner

*Primary Examiner*—Dang D Le
(74) *Attorney, Agent, or Firm*—Cantor Colburn LLP (57) ABSTRACT

A coil member such as a coil bobbin may include a cylindrical drum part around which a coil is to be wound in a circular shape. The cylindrical drum part is formed by two molding dies and a flat face part is formed on an outer peripheral face of the cylindrical drum part so that a space part is formed between an innermost circumferential face of the coil to be wound and the flat face part. The flat face part is formed so that the two molding dies are separated without pressing the outer peripheral face of the cylindrical drum part, and a joining part on the drum part which is formed by the two molding dies is located on the flat face part. The coil member may be only a coil bobbin, a coil bobbin with a terminal part, or a coil bobbin which is integrated with a stator core.

15 Claims, 8 Drawing Sheets

PRIOR ART

[Fig. 9]

PRIOR ART

COIL MEMBER, MOTOR AND MANUFACTURING METHOD FOR COIL MEMBER

CROSS REFERENCE TO RELATED APPLICATION

The present invention claims priority under 35 U.S.C. §119 to Japanese Application No. 2007-94897 filed Mar. 30, 2007, which is incorporated herein by reference.

FIELD OF THE INVENTION

An embodiment of the present invention may relate to a coil member, a motor in which the coil member is used, and a manufacturing method for the coil member.

BACKGROUND OF THE INVENTION

Figure 8:
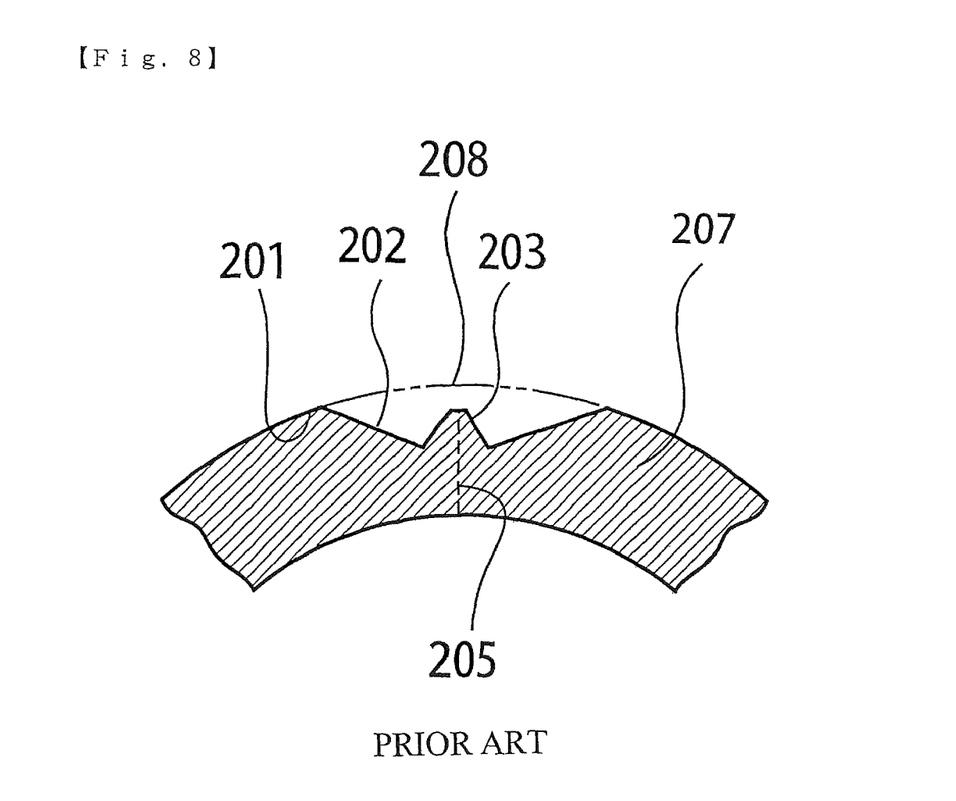
FIG. 8 shows an example of a conventional coil member and is an enlarged cross-sectional plan view showing a flat face part of a drum part of the conventional coil member.
Figure 9:
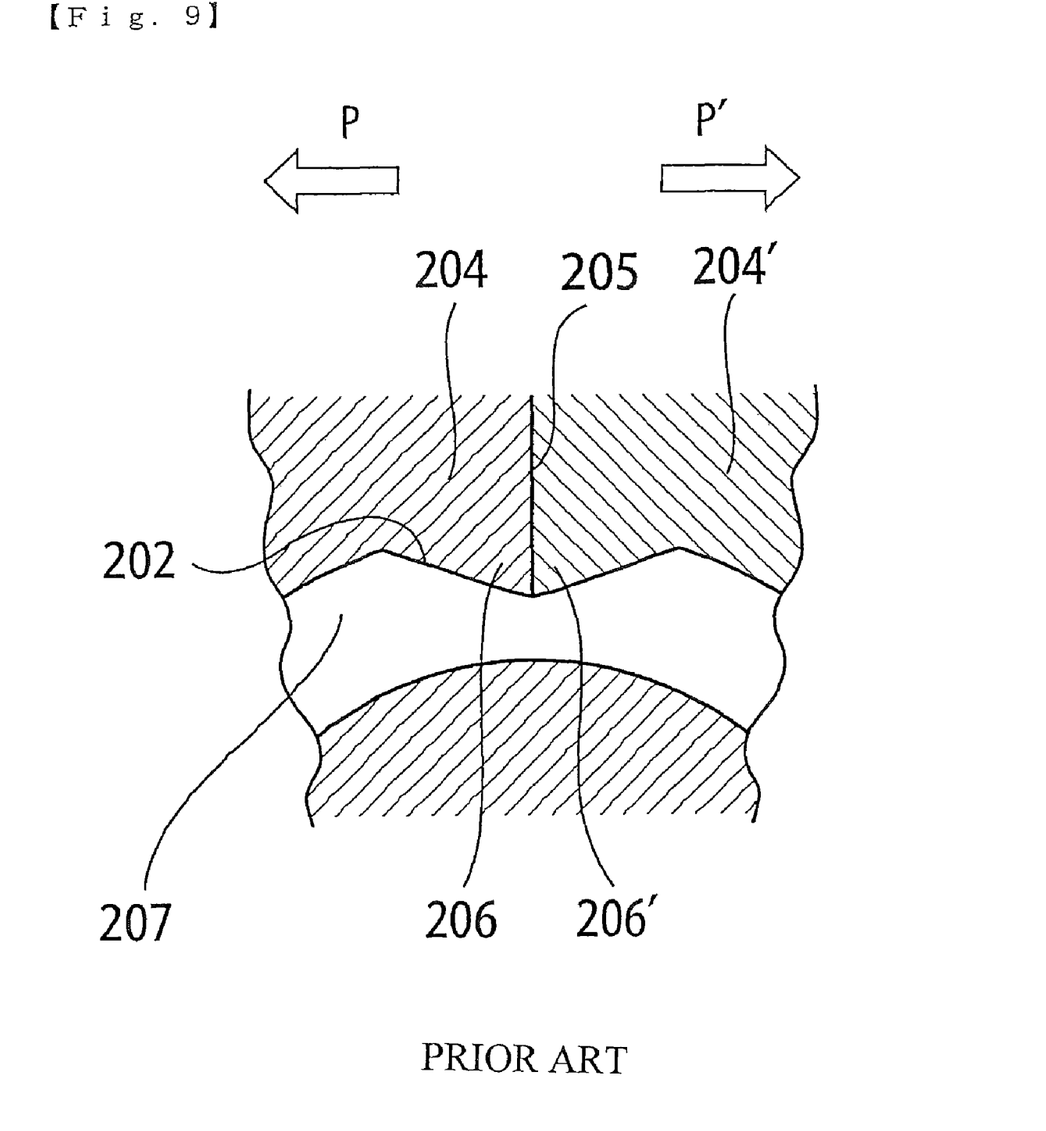
FIG. 9 shows an example of a conventional coil member and is an enlarged cross-sectional plan view schematically showing a state where the coil member shown in FIG. 8 is injection-molded by using molding dies.

In a drive device such as a stepping motor, a coil device is used which is structured of a coil member such as a coil bobbin around which a coil is wound. The coil member which is used in the coil device is commonly formed such that resin is injected into a cavity which is formed by combining a plurality of molding resin dies having a divided structure with each other together with a stator core and, after resin has been solidified, the molding resin dies are separated from each other to form the coil member. Therefore, a burr may be formed in a projected manner between jointing faces of the molding dies. When the burr is formed in a drum part around which a coil is wound, the burr and the coil may be abutted with each other to cause disconnection of the coil to occur. In order to prevent this problem, it has been disclosed that, as shown in FIG. 8, undercut parts 202 are formed on a cylindrical part 201 of a drum part 207, around which a coil is wound, along a parting line 205 which is formed by joining faces of the molding resin dies 204 and 204' as shown in FIG. 9. According to the structure as described above, the burr 203 is formed at a concaved position from an outer peripheral face 208 for winding of the drum part 207 to prevent disconnection of the coil (see, for example, Japanese Patent Laid-Open No. 2003-347117).

As shown in FIG. 9, in the coil member disclosed in the above-mentioned Patent Reference, the undercut parts 202 aye formed by the molding resin dies 204 and 204' and, after molding, the drum part 207 is released from the molding resin dies 204 and 204'. However, when the molding resin dies 204 and 204' are separated from each other in directions shown by the arrow "P" and "P"', protruded parts 206 and 206' of the molding resin dies 204 and 204' press the drum part 207. Especially in a coil member used in a small motor, a wall thickness of the drum part 207 is very thin. Therefore, when the molding resin dies 204 and 204' are separated from each other, the drum part 207 is pressed by the protruded parts 206 and 206' to cause a crack to occur and, in the worst case, the drum part 207 is unable to endure a winding pressure of a coil which is wound around the drum part 207 and thus the coil member is damaged.

SUMMARY OF THE INVENTION

In view of the problems described above, an embodiment of the present invention may advantageously provide a coil member which is capable of preventing disconnection or damage of a coil due to a burr and which is not damaged by molding dies at the time of releasing a molded product from the molding dies even when the coil member is a coil bobbin used in a small motor, and a motor with the use of the coil member, and a manufacturing method for the coil member.

Thus, according to an embodiment of the present invention, there may be provided a coil member including a cylindrical drum part in which a coil is wound around an outer peripheral face of the cylindrical drum part in a circular shape and which is formed by two molding dies movable in a direction perpendicular to an axial direction of the cylindrical drum part, and a flat face part which is formed on an inner side from the outer peripheral face of the cylindrical drum part so that a space part is formed between an innermost circumferential face of the coil which is to be wound around the outer peripheral face in the circular shape and the flat face part. The flat face part is formed so that the two molding dies are separated from each other without pressing the outer peripheral face of the cylindrical drum part, and a joining part on the drum part which is formed by the two molding dies is located on the flat face part.

According to the structure as described above, when the molding dies are separated from each other, the cylindrical drum part of the coil member is not pressed by the molding dies and thus, even when the coil member is a coil bobbin which is used in a small motor, the coil member is prevented from being damaged by the molding dies when a molded coil member is released from the molding dies. Further, even when a burr is formed along a joining part which is formed by the two molding dies, disconnection or damage of a coil due to the burr can be prevented. In accordance with an embodiment of the present invention, the flat face part is a parallel flat face which is formed in parallel with separating directions of the two molding dies when the two molding dies are separated from each other. Further, the coil member in accordance with the present invention may be a coil member comprised of only a coil bobbin, a coil bobbin with a terminal part, or a coil bobbin which is integrated with a stator core.

In accordance with an embodiment of the present invention, the flat face part is formed so that a burr which is formed along the joining part does not contact with the innermost circumferential face of the coil. Specifically, a length in a circumferential direction of the flat face part is set to be a length so that a burr formed at the joining part does not contact with the innermost circumferential face of the coil which is to be wound in a circular shape around the outer peripheral face of the cylindrical drum part. According to the structure as described above, even when a burr is formed at the joining part which is formed along the joining portion of the two molding dies, disconnection and damage of the coil due to the burr can be securely prevented. In this case, it is preferable that two parallel flat faces facing across a center of the cylindrical drum part are formed on the outer peripheral face of the cylindrical drum part.

In accordance with an embodiment of the present invention, a pair of ring-shaped flange parts is protrudingly formed in a radial direction from both end portions in an axial direction of the drum part, and a space which is formed between the pair of the flange parts is used as a coil winding part around which the coil is to be wound in the circular shape, and the flat face part is formed on an entire region between the flange parts in the axial direction of the drum part. According to the structure as described above, even when the coil is wound around up to both end portions in the axial direction of the drum part, disconnection and damage of the coil due to a burr can be prevented.

In accordance with an embodiment, a stator core having pole teeth is integrally formed in the drum part by insert molding.

In accordance with an embodiment, the pole teeth is insert-molded on the inner peripheral side of the drum part and, alternatively, inner peripheral faces of the pole teeth are exposed from an inner peripheral face of the drum part. In accordance with an embodiment, the drum part is not pressed by the molding dies when the molding dies are separated from each other. Therefore, even when the pole teeth are integrally molded on the inner peripheral side of the drum part by insert-molding or, alternatively, even when the inner peripheral faces of the pole teeth are exposed from the inner peripheral face of the drum part, the pole teeth are prevented from being pressed by the molding dies at the time of releasing from the molding dies and thus prevented from being protruded from the inner peripheral face of the drum part. Therefore, since the pole teeth are insert-molded on the inner peripheral side of the drum part, or since the inner peripheral faces of the pole teeth are exposed from the inner peripheral face of the drum part, the pole teeth can be closely disposed to the rotor magnet and thus efficiency of the motor is improved and a width in a radial direction of the drum part can be made thinner.

In accordance with an embodiment, one of the pole teeth is located at a position so as to overlap with the joining part in a radial direction of the drum part. According to the embodiment of the present invention, the drum part is not pressed by the molding dies when the molding dies are separated from each other. Therefore, even when one of the pole teeth is located at the position so as to overlap with the joining part in the radial direction of the drum part, the pole teeth does not protrude from the inner peripheral face of the drum part. Accordingly, degree of freedom for a motor design is improved and, as a result, efficiency of the motor can be improved.

More specifically, for example, when the undercut parts 202 are formed along the joining part as described in the above-mentioned Patent Reference, protruded parts of the molding dies for forming the undercut parts are abutted with undercut parts of the drum part at the time when the molding dies are separated from each other. Accordingly, when one of the pole teeth is located at a position so as to overlap with the joining part in a radial direction of the drum part, the one of the pole teeth is inclined to the inner side of the drum part to cause to be protruded to the inner side of the drum part. In order to prevent this problem, it is conceivable that a wall thickness of the drum part is made thicker so that the pole teeth do not incline to the inner side of the drum part even when the protruded parts of the molding dies abut and press the drum part. However, in this case, a space factor of the coil to the drum part is decreased by an amount that the wall thickness of the drum part is made thicker. Alternatively, it is conceivable that a space between the pole teeth and an outer peripheral face of the rotor is made wider so that the pole teeth do not contact with the outer peripheral face of the rotor even when the pole teeth are inclined to the inner side of the drum part. However, also in this case, the space factor of the coil to the drum part is decreased by an amount that the space between the pole teeth and the rotor is made wider. Further, it is conceivable that the pole teeth are disposed so as to avoid the undercut part but degree of freedom for a motor design decreases and, as a result, efficiency of the motor is decreased.

According to the embodiment of the present invention, when the molding dies are separated from each other, the drum part is not pressed by the molding dies. Therefore, even when one of the pole teeth is radially overlapped with the joining part, the one of the pole teeth is not inclined to the inner side of the drum part and not protruded from the inner peripheral face of the drum part. Accordingly, even when one of the pole teeth is radially overlapped with the joining part, a space factor of the coil to the drum part is not required to decrease. Further, degree of freedom of a motor design, i.e., degree of freedom of disposing positions of the pole teeth can be improved without causing a space between the pole teeth and the outer peripheral face of the rotor magnet to be wider and, as a result, efficiency of the motor can be improved.

In accordance with an embodiment, the joining part is located at a substantially center position on the flat face part in separating directions of the two molding dies. According to the structure as described above, an allowable range that a burr does not abut with the coil can be increased in comparison with a case that the joining part is located at a position deviated from the center position of the flat face part.

In accordance with an embodiment, at least a pair of the flat face parts are formed in a point-symmetrical manner in a direction perpendicular to an axial line direction of the drum part with respect to a center of the drum part. According to the structure as described above, the outer peripheral face of the drum part of the coil member can be formed by using slide dies movable in opening and closing directions. Therefore, the coil member can be released from the molding dies without using specially prepared molding dies and without damaging the coil member.

The coil member in accordance with the above-mentioned embodiments may be applied to a motor which is provided with a stator having a stator assembly, which is structured such that a coil is wound around the outer peripheral face of the cylindrical drum part of the coil member, and a rotor having a rotor magnet which is disposed on an inner side of the drum part. The coil of the motor which is wound around the drum part of the coil member is prevented from being disconnected and damaged by a burr and thus failure rate can be decreased.

In a motor in accordance with an embodiment of the present invention, the stator includes an inner yoke for structuring the stator assembly formed with pole teeth which are integrally molded on an inner wall side of the drum part by insert-molding, and an outer yoke for structuring the stator assembly formed with pole teeth which are inserted into recessed parts formed recessed from the inner peripheral face of the drum part in a radial direction. The pole teeth of the inner yoke and the pole teeth of the outer yoke are alternately and adjacently disposed in the axial direction on the inner peripheral side of the drum part.

In a motor in accordance with an embodiment of the present invention, the pole teeth of the inner yoke and the pole teeth of the outer yoke are disposed to face the rotor magnet in a state that inner peripheral faces of the pole teeth are exposed from the inner peripheral face of the drum part. In this case, it is preferable that outer peripheral faces and side faces of both the pole teeth of the inner yoke and the pole teeth of the outer yoke are covered with the drum part.

The coil member in accordance with an embodiment of the present invention may be manufactured as follows. In other words, a manufacturing method for the coil member includes preparing two molding dies for forming an outer peripheral face of the cylindrical drum part, each of which is formed with a molding die flat face that is formed in separating directions of the two molding dies so that the molding die flat face does not press the outer peripheral face of the cylindrical drum part when the two molding dies are separated from each other, and forming the outer peripheral face of the cylindrical drum part by the two molding dies, and forming a flat face part on the outer peripheral face of the cylindrical drum part by the molding die flat faces of the two molding dies.

According to the above-mentioned manufacturing method for the coil member, when the molding dies are separated from each other, the molding dies do not interfere with the cylindrical drum part of the coil member and thus, even when the coil member is a small coil bobbin which is used in a small motor, the cylindrical drum part is not pressed to the inner peripheral side by the molding dies when a molded product is released from the molding dies. Further, even when a burr is formed on the outer peripheral face of the cylindrical drum part in the axial direction along the joining portion of the two molding dies, the burr can be accommodated in a space formed between the flat face part on the outer peripheral face of the cylindrical drum part and the coil which is to be wound around the drum part in a circular shape and thus the burr can be set so as not to contact with the coil to be wound.

In the manufacturing method for the coil member, it is preferable that a length of the molding die flat face in a joining direction of the molding dies is set to be a length so that a burr formed along a joining part of the two molding dies does not contact with an innermost circumferential face of the coil which is to be wound around the outer peripheral face of the cylindrical drum part in the circular shape. According to the manufacturing method as described above, even when a burr is formed on the outer peripheral face of the cylindrical drum part in the axial direction along the joining portion of the two molding dies, the burr can be surely prevented from contacting with the coil which is to be wound around the drum part.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 shows an example of a forming method for a coil member by using molding slide dies in accordance with an embodiment of the present invention.

FIG. 5 shows an example of a forming method for a coil member by using molding dies in accordance with an embodiment of the present invention.

DETAILED DESCRIPTION OF THE PREFERRED EMBODIMENTS

A motor in accordance with an embodiment of the present invention will be described below with reference to the accompanying drawings.

Figure 1:
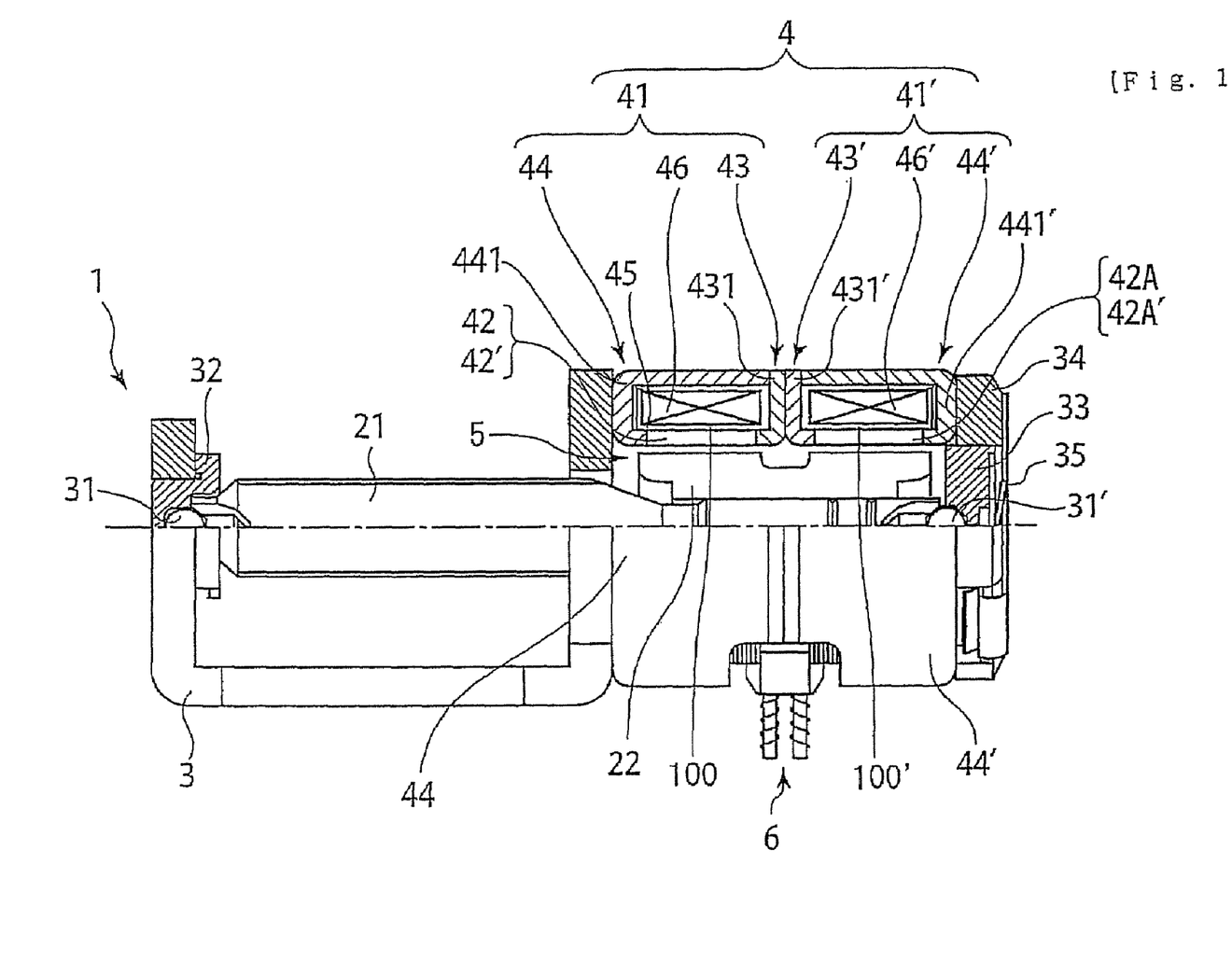
FIG. 1 is a half cross sectional view showing an entire motor in accordance with an embodiment of the present invention.
Figure 2:
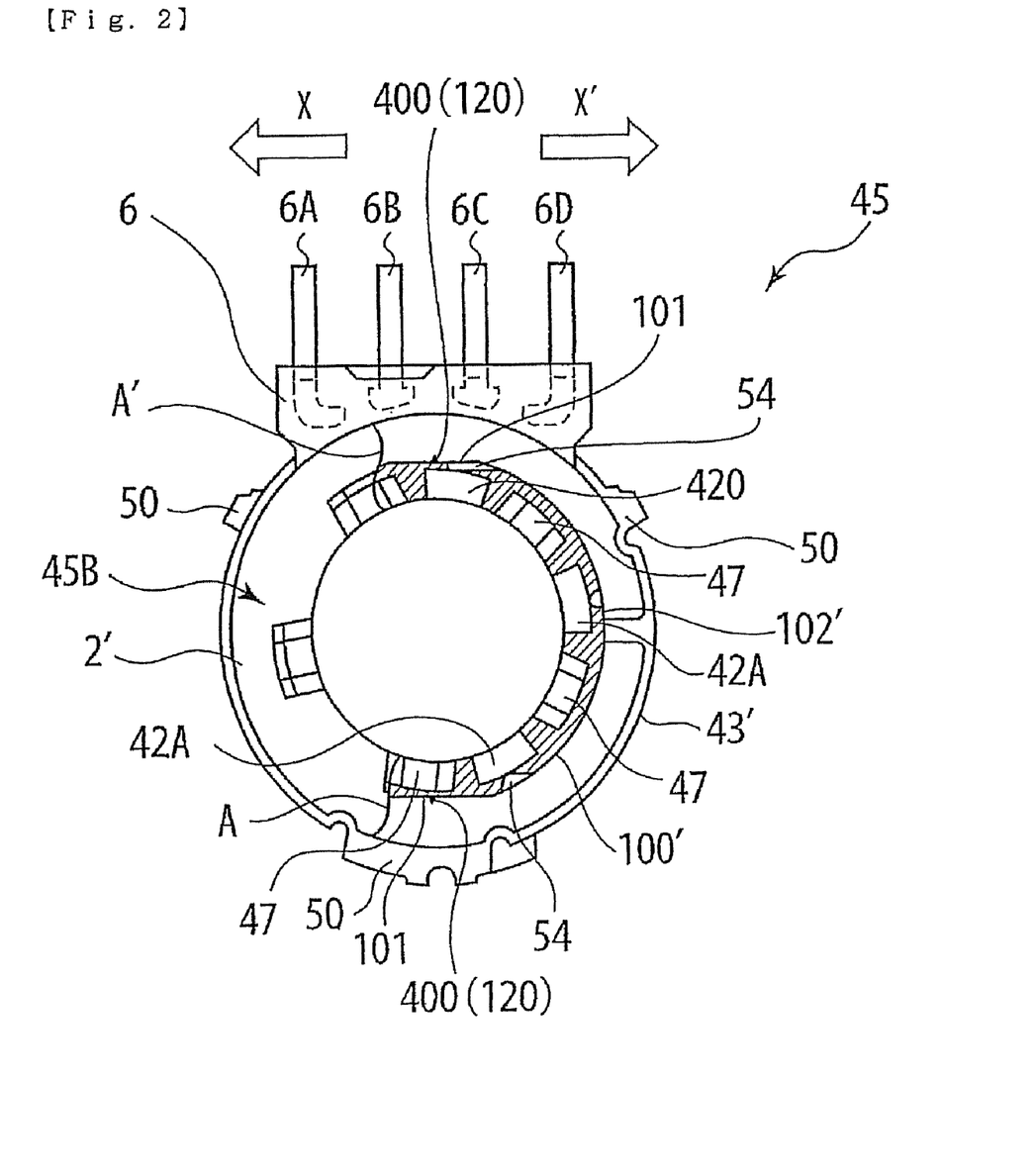
FIG. 2 shows an example of a coil member in accordance with an embodiment of the present invention and is a partly cross-sectional plan view showing the coil member which is partly cut by the line "A-A'" shown in FIG. 3 and viewed in the arrow direction.
Figure 3:
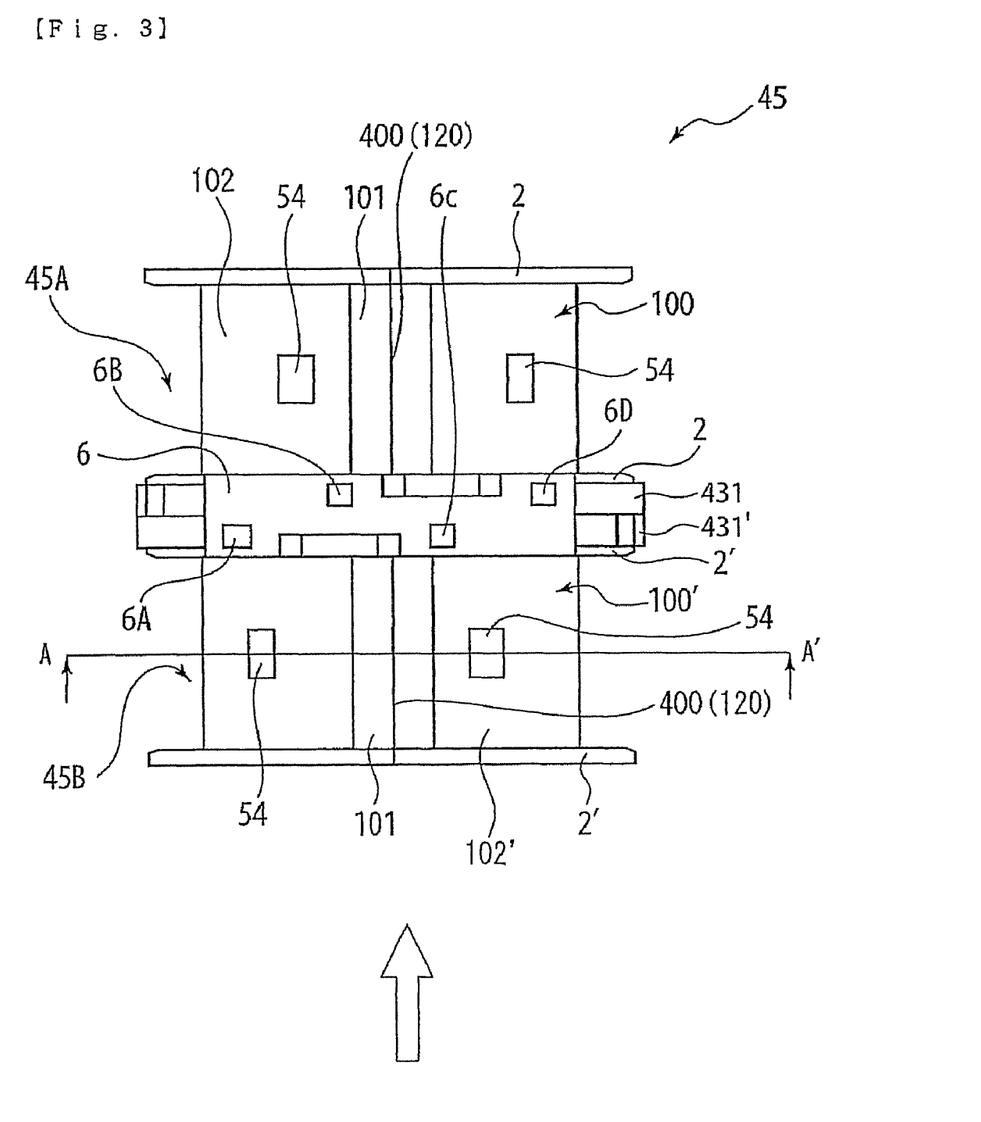
FIG. 3 shows an example of a coil member in accordance with an embodiment of the present invention and is a side view of the coil member used in the motor shown in FIG. 1.
Figure 4:
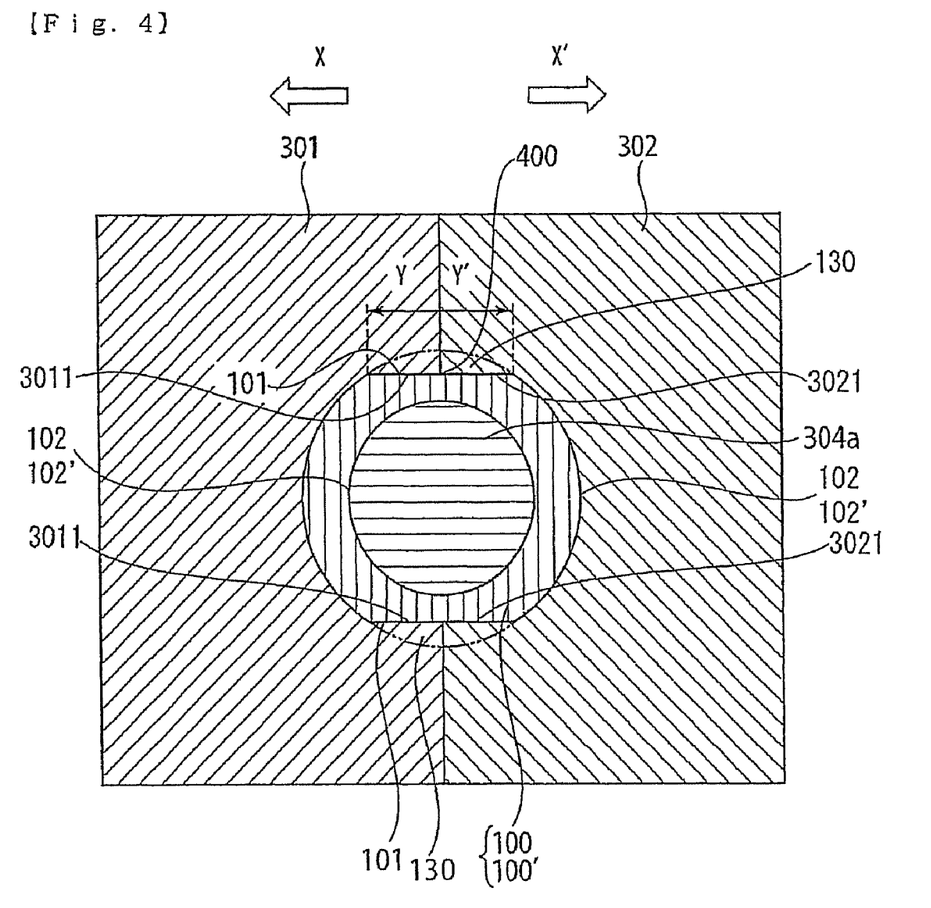
FIG. 4 is a transverse cross-sectional view schematically showing a drum part of the coil member and the slide dies which are located in a closed state.
Figure 5:
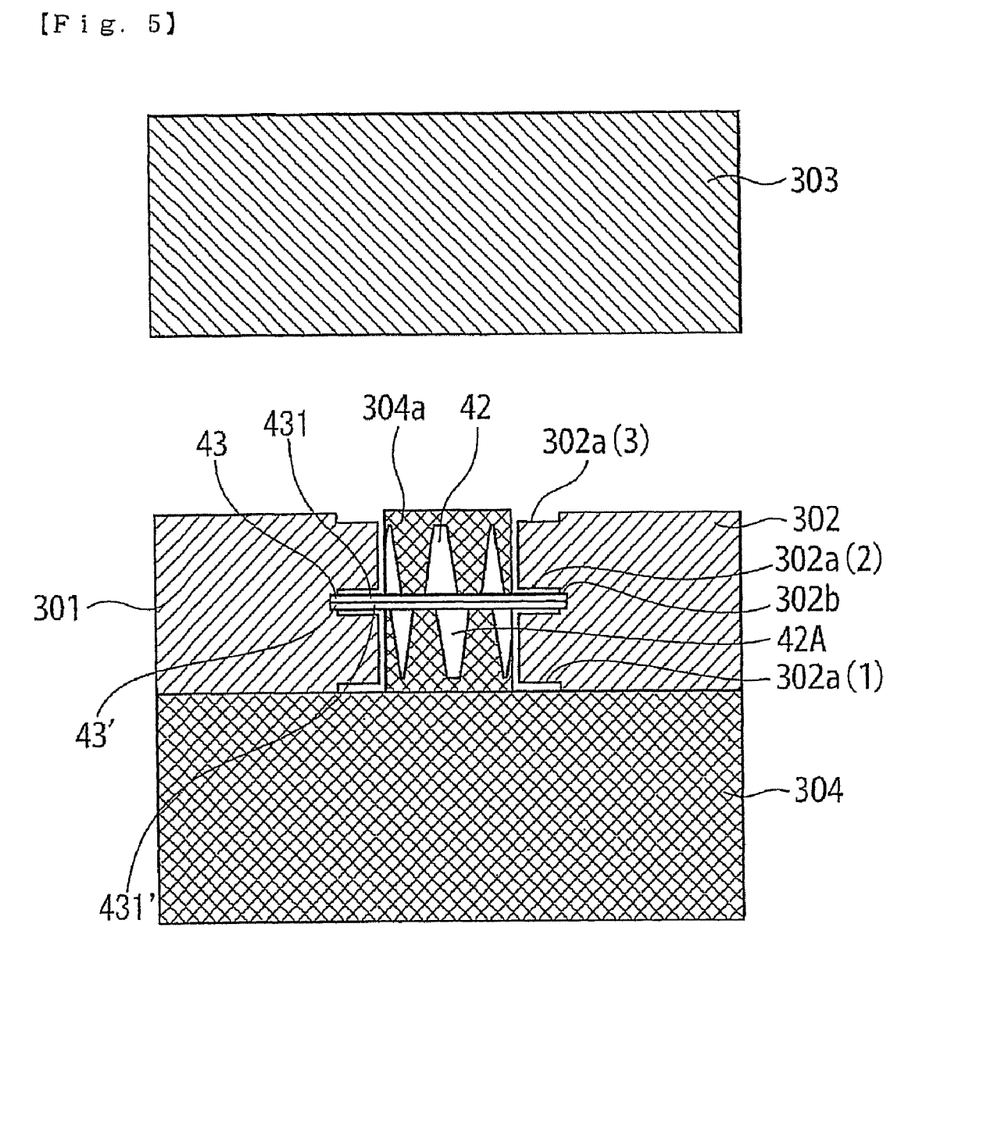
FIG. 5 is a cross-sectional view schematically showing molding dies in which inner yokes are held by slide dies and an upper die is located in an opened state.
Figure 6:
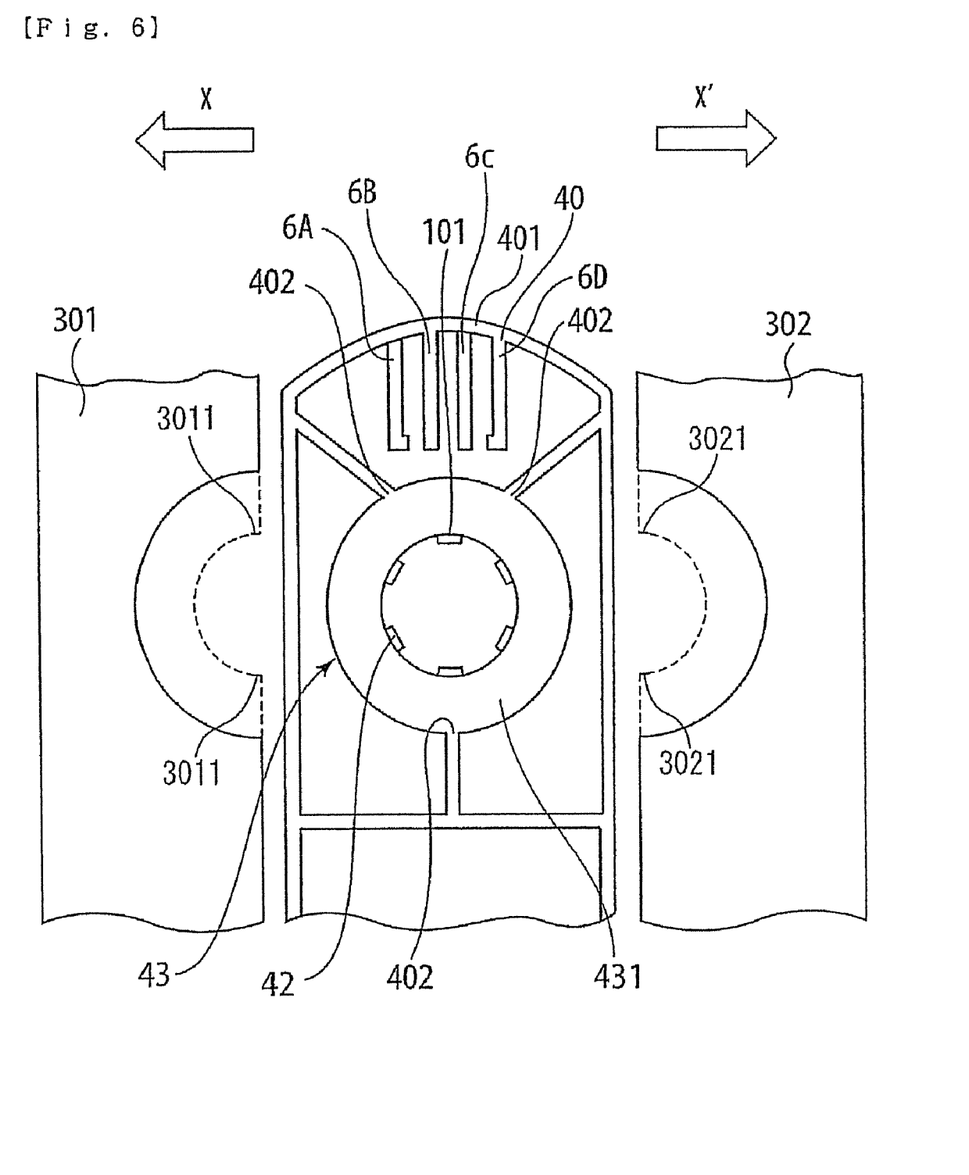
FIG. 6 shows an example of a forming method for a coil member by using molding dies in accordance with an embodiment of the present invention and is a plan view schematically showing a state where slide dies are separated from each other.
Figure 7:
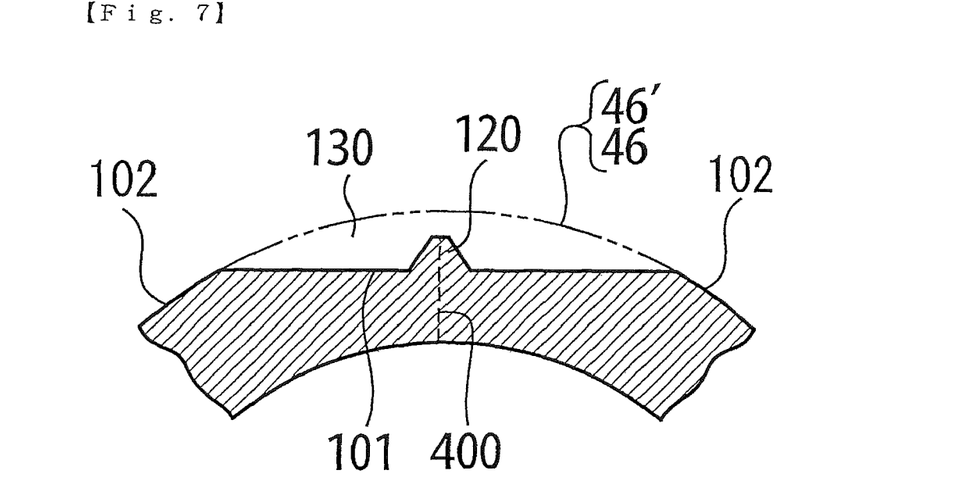
FIG. 7 is an enlarged cross-sectional plan view showing a parallel flat face part of the drum part of the coil member in FIG. 4 in accordance with an embodiment of the present invention.

FIG. 1 is a half cross sectional view showing an entire motor in accordance with an embodiment of the present invention. FIG. 2 is a partly cross-sectional plan view showing a coil member which is partly cut by the line "A-A'" shown in FIG. 3 and viewed in the arrow direction. FIG. 3 is a side view of the coil member for the motor shown in FIG. 1. FIG. 4 is a transverse cross-sectional view schematically showing a drum part of a coil member and slide dies which are located in a closed state. FIG. 5 is a cross-sectional view schematically showing molding dies in which inner yokes are held by slide dies and an upper die is located in an opened state. FIG. 6 is a plan view schematically showing a state where slide dies are located in an opened state. FIG. 7 is an enlarged cross-sectional plan view showing a parallel flat face part of the drum part of the coil member in FIG. 4.

As shown in FIG. 1, a motor 1 in this embodiment includes a rotor 5, a stator 4 which is disposed so as to surround the rotor 5, and a bracket 3 which is fixed to an output side end face of the stator 4.

The rotor 5 is provided with a rotor shaft 21 and a rotor magnet 22 which is fixed to an outer periphery of the rotor shaft 21.

One end of the rotor shaft 21 is supported through a steel ball 31 by an output side bearing 32 which is held by a bracket 3 having a "U"-shaped cross section that is fixed to the stator 4. The other end of the rotor shaft 21 is supported through a steel ball 31' by an opposite-to-output side bearing 33 which is held by a bearing hold member 34 that is fixed to the stator 4. The opposite-to-output side bearing 33 is urged to an output side of the rotor shaft 21 by an urging member 35 which is fixed to the bearing hold member 34. Therefore, the rotor shaft 21 is supported by the output side bearing 32 and the opposite-to-output side bearing 33 in a state that the rotor shaft 21 is urged by the urging member 35 in a direction of the output side bearing 32.

The stator 4 includes a pair of stator core assemblies 41 and 41' which are superposed on each other in an axial direction of the rotor shaft 21. In this embodiment, the stator 4 is formed in a two-layer structure and the rotor magnet 22 is rotatably disposed in an inside of the stator 4 with a predetermined gap space. The respective stator core assemblies 41 and 41' include outer yokes 44 and 44' as a stator core which are disposed on outer sides in an axial direction in a superposed state, inner yokes 43 and 43' as the stator core which are disposed on inner sides of the outer yokes 44 and 44' in the axial direction and which are superposed in a state that their flange parts 431 and 431' are contacted with each other, a coil member 45 which is disposed in a space structured of the outer yoke 44 and the outer yoke 44', and coils 46 and 46' which are wound around drum parts of the coil member 45.

The inner yokes 43 and 43' include ring-shaped flange parts 431 and 431' and a plurality of pole teeth 42 and 42A which are formed to be bent from inner circumferential edges of the ring-shaped flange parts 431 and 431' and disposed to be juxtaposed in a circumferential direction so as to face the rotor magnet 22. The pole teeth 42 and 42A are formed to be bent from the flange part 431 and 431' in a substantially perpendicular direction.

The outer yokes 44 and 44' are formed, similarly to the inner yokes 43 and 43', with ring-shaped flange parts 441 and 441'. A plurality of pole teeth 42' and 42A' are formed to be bent from inner circumferential edges of the ring-shaped flange parts 441 and 441' and disposed to be juxtaposed in a circumferential direction so as to face the rotor magnet 22. The pole teeth 42' and 42A' are formed to be bent from the flange part 441 and 441' in a substantially perpendicular direction. Outer peripheral edges of the ring-shaped flange parts 441 and 441' are formed to be bent so as to cover outer peripheries of the coils 46 and 46' and formed as a motor case. In other words, in this embodiment, the outer yokes 44 and 44' are also used as a motor case.

The coils 46 and 46' are wound around the outer peripheral face of the drum part 100 of the coil member 45 so that their circular shapes are maintained. In this embodiment, the drum part around which the coil 46' is wound is indicated as a drum part 100' to distinguish from the drum part 100 around which the coil 46 is wound. The coil member 45 is integrally formed with the inner yokes 43 and 43' by using insert molding like injection molding. In this embodiment, a terminal block 6 provided with terminal pins 6A through 6D is integrally molded at outer peripheral edges of the flange parts 431 and 431' of the inner yokes 43 and 43'. The pole teeth 42 of the inner yoke 43 and the pole teeth 42' of the outer yoke 44 are disposed on the inner peripheral face of the coil member 45 so as to be alternately juxtaposed in the circumferential direction. Similarly, the pole teeth 42A of the inner yoke 43' and the pole teeth 42A' of the outer yoke 44' are disposed on the inner peripheral face of the coil member 45 so as to be alternately juxtaposed in the circumferential direction. "Insert-molding" in this embodiment means a forming method in which a metal member is inserted within molding dies to integrate the metal member with resin.

Next, the structure of the coil member 45 in this embodiment will be described below with reference to FIGS. 2 and 3. As shown in FIGS. 2 and 3, in this embodiment, the cylindrical drum parts 100 and 100' of the coil member 45 around which the coils 46 and 46' are to be wound are injection-molded by two molding dies 301 and 302, which are moved right and left directions that are perpendicular to an axial direction along the drum parts 100 and 100'. The coil member 45 includes the cylindrical drum parts 100 and 100' for structuring a coil bobbin, ring-shaped flange parts 2 and 2' for structuring the coil bobbin which are respectively protruded from both end portions in the axial direction of the drum parts 100 and 100' over an entire circumference in the circumferential direction, the inner yokes 43 and 43' having the pole teeth 42 and 42A which are integrally formed with the drum parts 100 and 100' by insert-molding, and the terminal block 6 integrally formed on the outer peripheral edge of the flange parts 431 and 431' of the inner yokes 43 and 43'.

The outer peripheral faces of the drum parts 100 and 100' are formed with joining parts 400 in the axial direction along a joining portion of the slide dies 301, 302 comprising two molding dies shown in FIG. 4. The joining parts 400 may be formed with a burr 120. The joining part 400 may be often formed with the burr 120 but the burr 120 is not always formed from the beginning. The burr 120 may be often formed after the slide dies 301 and 302 have been used for a long time and thus, taking a used number of times of the molding dies, a used time period of years of the molding dies and the like into consideration, the maximum projecting height of the burr 120 which is formed along the joining part 400 is estimated. Two molding dies 301 and 302 are formed with two molding die flat faces 3011 and 3021 for forming a parallel flat face 101 described below on outer peripheral faces of the drum parts 100 and 100'. The molding die flat faces 3011 and 3021 are formed to be in parallel with separated directions (arrow "X" and "X'" directions) of the two slide dies 301 and 302 so that the drum parts 100 and 100' are not pressed by the two slide dies 301 and 302 in an area where the slide dies 301 and 302 are slid on the drum parts 100 and 100' when the molding dies 301 and 302 are separated from each other in the arrow "X" and "X'" directions shown in FIG. 4. The joining part 400 of the molding dies 301 and 302 is formed on the parallel flat face 101 that is formed on the outer peripheral faces of the drum parts 100 and 100'. In this embodiment, the parallel flat face 101 is formed on two portions in a point symmetrical manner with respect to centers of the drum parts 1.00 and 100' in a direction (radial direction) perpendicular to the axial direction. Therefore, similarly, a pair of the molding die flat faces 3011 and 3021 are formed on the molding dies 301 and 302. The joining part 400 is, as shown in FIG. 3, located at a substantially center position of the flat face 101 in the separated directions of tie slide dies 301 and 302.

In this embodiment, as shown in FIG. 4, the parallel flat face 101 on which the joining part 400 is positioned is formed so that lengths of widths "Y" and "Y'" of the parallel flat face 101 is equal to each other in the separated direction of the slide dies 301 and 302 when the slide dies 301 and 302 are separated in the arrow "X" and "X'" direction. In order to set the lengths of the widths "Y" and "Y'" of the parallel flat face 101 equal to each other, the lengths of the molding the flat faces 3011 and 3021 formed on the molding dies 301 and 302 are set to be equal to each other. Alternatively, the lengths of the widths "Y" and "Y'" of the parallel flat face 101 may be set to be different from each other. The joining part 400 is formed along the joining portion of the two slide dies 301 and 302. In other words, as shown in FIG. 3, the joining part 400 is formed over an entire portion in the axial direction of the drum part 100 which is sandwiched by an upper flange part 2 (upper side in FIG. 3) formed at an upper end face of the drum part 100 and a lower flange part 2 (lower side in FIG. 3) formed at a bottom end face of the drum part 100. Further, the joining part 400 is formed over an entire portion in the axial direction of the drum part 100' which is sandwiched by an upper flange part 2' (upper side in FIG. 3) formed at an upper end face of the drum part 100' and a lower flange part 2' (lower side in FIG. 3) formed at a bottom end face of the drum part 100'.

Similarly to the joining part 400, as shown in FIG. 3, the parallel flat face 101 is formed over the entire portion in the axial direction of the drum part 100 which is sandwiched by the upper flange part 2 (upper side in FIG. 3) formed at the upper end face of the drum part 100 and the lower flange part 2 (lower side in FIG. 3) formed at the bottom end face of the drum part 100. Further, the parallel flat face 101 is formed over an entire portion in the axial direction of the drum part 100' which is sandwiched by an upper flange part 2' (upper side in FIG. 3) formed at an upper end face of the drum part 100' and a lower flange part 2' (lower side in FIG. 3) formed at a bottom end face of the drum part 100'. Further, the lengths of the widths "Y" and "Y'" of the parallel flat face 101 (see FIG. 4) are set so that, when a burr is formed along the joining part 400, the burr does not contact with the coils 46 and 46' which are to be wound around the drum parts 100 and 100' in a circular shape. In other words, when the coils 46 and 46' are wound around the outer peripheral faces 102 and 102' of the drum parts 100 and 100' in a circular shape, the space parts 130 (see FIG. 7) are formed between the inner circumferential faces of the circular coils 46 and 46' and the parallel flat faces 101. When expressed in other words, the coils 46 and 46' are wound around the outer peripheral faces 102 and 102' of the drum parts 100 and 100' in the circular shape so that the space parts 130 (see FIG. 7) are formed between the circular coils 46 and 46' and the parallel flat faces 101. In this case, in the state where the coils 46 and 46' are wound around the drum parts 100 and 100' in a circular shape, positions in a radial direction of the innermost peripheral portions of the coils 46 and 46' and a position in the radial direction of the joining part 400 on the parallel flat face 101 are predetermined when the widths "Y" and "Y'" of the parallel flat face 101 are determined. Therefore, in consideration of a size of the burr formed along the joining part 400, the widths "Y" and "Y'" of the parallel flat face 101, i.e., the lengths of the molding die flat faces 3011 and 3021 formed in the molding dies 301 and 302 are set so that a tip end of the burr do not contact with the coils 46 and 46'. In this embodiment, when the widths "Y" and "Y'" of the parallel flat face 101 are too long, the positions in the radial direction of the innermost peripheral portions of the coils 46 and 46' may be brought nearer on an inner side from the original circumferential position. Therefore, it is preferable that the widths "Y" and "Y'" are smaller within a range that the coils 46 and 46' do not contact with the burr formed along joining part 400.

A plurality of cut-out parts 54 is formed on outer peripheral faces of the drum parts 100 and 100'. The cut-out part 54 is formed so as to reach to the outer peripheral faces of the pole teeth 42 and 42A of the inner yokes 43 and 43'. In this embodiment, the slide dies 301 and 302 are formed with projecting parts (not shown) for preventing inclination of the pole teeth 42 and 42A of the inner yokes 43 and 43', which are insert-molded on the inner peripheral side of the drum parts 100 and 100' in a manufacturing process of the coil member 45, in order to prevent from being inclined on the outer peripheral side due to a load of resin injection to the slide dies 301 and 302. Therefore, the cut-out part 54 is formed by injecting resin in the state that the projecting parts for preventing inclination are abutted with the outer peripheral faces of the pole teeth 42 and 42A. It is preferable that the projecting parts are formed to abut with all the pole teeth 42 and 42A and, in this case, the cut-out parts 54 are formed on all the outer peripheral faces of the pole teeth 42 and 42A.

The pole teeth 42 and 42A of the inner yokes 43 and 43' are integrally molded within the drum parts 100 and 100', and the pole teeth 42 and 42A of the inner yokes 43 and 43' are insert-molded on the inner peripheral sides of the drum parts 100 and 100'. In this embodiment, the outer peripheral faces of the pole teeth 42 and 42A are abutted with the projecting parts for preventing inclination and the inner peripheral faces of the pole teeth 42 and 42A are abutted with a center support part 304a of a lower die 304 which will be described below. Therefore, resin is injected in the state that the pole teeth 42 and 42A are sandwiched and held by the projecting parts and the center support part 304a and thus the pole teeth 42 and 42A are prevented from being inclined in the radial direction due to a pressure of the injected resin. Further, the resin is injected in the state that the inner peripheral faces of the pole teeth 42 and 42A are abutted with the center support part 304a of the lower die 304. Therefore, the pole teeth 42 and 42A are insert-molded on the inner peripheral side in the drum parts 100 and 100' in the buried state and the outer peripheral faces and side faces of the pole teeth 42 and 42A are covered with resin except portions where the projecting parts for preventing inclination are abutted. On the other hand, the inner peripheral faces of the pole teeth 42 and 42A are not buried within the drum parts 100 and 100' and are exposed from the inner peripheral faces of the drum parts 100 and 100'. Therefore, the inner peripheral faces of the pole teeth 42 and 42A are opposed to the rotor magnet 22 without resin (drum parts 100 and 100'). Further, the pole teeth 420 of a plurality of the pole teeth 42 and 42A are formed at an overlapping position with the joining part 400 in the radial direction.

Pole teeth inserting parts 17 to which the pole teeth 42' and 42A' of the outer yokes 44 and 44' are inserted are formed on the inner peripheral faces of the drum parts 100 and 100'. The pole teeth inserting part 47 is a recessed part which is recessed from the inner peripheral face in the radial direction and is opened to the outer side flange parts 2 and 2'. Therefore, when the pole teeth 42' and 42A' of the outer yokes 44 and 44' are inserted from the outer side in the axial direction of the flange parts 2 and 2', similarly to the adjacent pole teeth 42 and 42A of the inner yokes 43 and 43', the outer peripheral faces and side faces of the pole teeth 42' and 42A' are covered with resin but their inner peripheral faces are exposed from the inner peripheral faces of the drum parts 100 and 100' and opposed to the rotor magnet 22 without resin (drum parts 100 and 100').

In this embodiment, a space is used as a winding part 45A which is formed between a pair of the flange parts 2 that are formed at the upper end face of the drum part 100 and at the lower end face of the drum part 100 on the flange part 431 of the inner yoke 43. Further, a space is used as a winding part 45B which is formed between a pair of the flange parts 2' that are formed at the upper end face of the drum part 100' under the flange part 431' of the inner yoke 43' and at the lower end face of the drum part 100'.

The winding part 45A is separated from the flange part 431 of the inner yoke 43 and the flange part 441 of the outer yoke 44 by the flange parts 2, and the pole teeth 42 and 42' of the inner yoke 43 and the outer yoke 44 are separated from the winding part 45A by the drum part 100 which is formed so as to cover their outer peripheral faces with resin. Therefore, the coil 46 which is wound around the winding part 45A is capable of securing a sufficient insulation property from the inner yoke 43 and the outer yoke 44. Further, the winding part 45B is separated from the flange part 431' of the inner yoke 43' and the flange part 441' of the outer yoke 44' by the flange parts 2', and the pole teeth 42A and 42A' of the inner yoke 43' and the outer yoke 44' are separated from the winding part 45B by the drum part 100' which is formed so as to cover their outer peripheral faces with resin. Therefore, the coil 46' which is wound around the winding part 45B is capable of securing a sufficient insulation property from the inner yoke 43' and the outer yoke 44'.

The terminal block 6 is integrally formed at the outer peripheral edge of the flange parts 431 and 431' of the inner yokes 43 and 43' by insert-molding. Four terminal pins 6A, 6B, 6C and 6D are formed in the terminal block 6 so as to protrude in the radial direction, and end parts of the coils 46 and 46' are bound around the respective terminal pins 6A, 6B, 6C and 6D. In this embodiment, the terminal block 6 is, as shown in FIG. 3, integrally formed with the flange part 2 formed at the lower end face of the drum part 100 and the flange part 2' formed at the upper end face of the drum part 100'.

Next, molding dies 301 through 304 as forming dies which are used to manufacture the coil member 45 will be described below.

As shown in FIGS. 4 and 5, the molding dies 301 through 304 as the forming dies include an upper die 303, a pair of right and left slide dies 301 and 302, and a lower die 304. Further, the molding dies 301 through 304 are structured as one unit having the upper die 303, a pair of the right and left slide dies 301 and 302, and the lower die 304 and, in this embodiment, a plurality of units are adjacently provided. Further, the lower die 304 is mounted with another slide die (not shown) for forming the terminal block 6 in addition to the slide dies 301 and 302.

As shown in FIG. 4, the arrows "X" and "X'" indicate a separating direction when the slide dies 301 and 302 are separated from a molded product (coil member 45). Further, the molding die flat faces 3011 and 3021 for forming the parallel flat face 101 are formed in parallel with the separating directions of the two slide dies 301 and 302. Therefore, the parallel flat face 101 which is the entire region where the slide dies 301 and 302 and the drum parts 100 and 100' are slid with each other when the slide dies 301 and 302 are separated each other, does not interfere with the slide dies 301 and 302. Further, in this embodiment, a pair of the parallel flat faces 101 is formed in a point symmetrical manner with respect to the center of the drum parts 100 and 100'.

As shown in FIG. 5, the upper die 303 is a cover-shaped molding die for closing an upper face of a cavity which is formed by closing of the lower die 304 and the slide dies 301 and 302a. The cavity is a space into which synthetic resin is flown and the upper die 303 is provided so as to be capable of moving in an up-and-down direction. Further, the upper face of the lower die 304 is protrudingly formed with the center support part 304a for supporting the inner peripheral faces of the pole teeth 42 and 42A of the inner yokes 43 and 43' of the coil member 45. In other words, the center support part 304a is inserted into the center portions of the inner yokes 43 and 43' of the coil member 45 to form the inner peripheral faces of the drum parts 100 and 100'.

A pair of the right and left slide dies 301 and 302 is used to form an outer side face including outer peripheral faces of the drum parts 100 and 100' of the coil member 45 for structuring the winding parts 45A and 45B. The slide dies 301 and 302 are arranged on the lower die 304 s as to be capable of opening and closing in the directions of the arrows "X" and "X'" shown in FIG. 4. Inner side faces of the slide dies 301 and 302 are formed with three grooves sequentially arranged from a bottom to its upper side, i.e., a first groove 302a(1) which is the lowest groove, a second groove 302a(2) which is a groove at a center portion, and a third groove 302a(3) which is the uppermost groove. In this embodiment, in order to form the terminal block 6, a slide die (not shown) which is separately provided from the slide dies 301 and 302 is arranged so as to be capable of moving in an opening/closing direction perpendicular to the direction shown by the arrows "X" and "X'".

As shown in FIG. 5, a cavity in a semicircular shape is formed by opposite faces facing in the axial direction of the groove 302a(2) at the center portion. Further, a cavity of the first lowest groove 302a(1) is formed by the lower die 301 and the slide dies 301 and 302, and a cavity of the third uppermost groove 302a(3) is formed by the upper die 303 and the slide dies 301 and 302.

A holding part 302b is formed in the second groove 302a(2) at the center portion so as to protrude on an outer side of the cavity to hold outer peripheral edges of both the flange parts 431 and 431' of the overlapped inner yokes 43 and 43'. Therefore, the cavity of the second groove 302a(2) is formed on the inner side of the holding part 302b as a semicircular space where synthetic resin flows into both sides of the flange parts 431 and 431' of the inner yokes 43 and 43'.

Next, a manufacturing method for the coil member 45 using the molding dies 301 through 304 as forming dies will be described below.

First, as shown in FIG. 6, in a die-opened state of the slide dies 301 and 302, two terminal pins 6B and 6D and the inner yoke 43 comprised of the pole teeth 42 and the flange part 431 are held in a horizontal state by using a position holding means (not shown). In this embodiment, the inner yoke 43 and the terminal pins 6B and 6D are structured by using one piece of plate 401 and connected through a connection member 40. Further, the inner yoke 43' is structured by using one piece of plate having a similar shape to the inner yoke 43. When the inner yoke 43' is held with the inner yoke 43 in a reverse and downward manner, the downward pole teeth 42A are obtained and two terminal pins 6A and 6C are disposed.

The inner yoke 43 connected to the plate 401 is set so that the pole teeth 42 are directed upward in the drawing and the inner yoke 43' (not shown) is set so that the pole teeth 42A are directed downward in the drawing and, in the state that their flange parts 431 and 431' are superposed on each other, the inner yoke 43 and the inner yoke 43' have been integrated with each other by spot welding or laser welding. The inner yokes 43 and 43' which have been integrated with each other are located and retained in a positioned state in the axial direction by position holding means (not shown). Further, in this state, the center support part 304a is inserted into the inner peripheral faces of the inner yokes 43 and 43' as shown in FIG. 5 and their positioning in their radial direction are performed simultaneously. Further, in this state, the flange parts 431 and 431' of the inner yokes 43 and 43' face the second groove 302a(2) at the center portion of the right and left slide dies 301 and 302 so as to be capable of being inserted into the second groove 302a(2) as shown in FIG. 5. Further, as shown in FIG. 5, the upper die 303 is located in an opened state where the upper die 303 is moved on an upper side with respect to the slide dies 301 and 302.

Next, the slide dies 301 and 302 are closed by moving them in opposite directions to the directions shown by the arrows "X" and "X'" shown in FIG. 6. The slide dies 301 and 302 are formed with molding die flat faces 3011 and 3021 which are parallel to the arrows "X" and "X'" that are separating directions of the slide dies 301 and 302. The slide die not shown in the drawing for forming the terminal block 6 is closed from the direction perpendicular to the "X" and "X'" directions. As a result, the flange parts 431 and 431' of the inner yokes 43 and 43' and four terminals 6A, 6B, 6C and 6D are held in a positioned state with respect to the slide dies 301 and 302. In this embodiment, the position holding means not shown in the drawing is retreated on an outer side of the slide dies 301 and 302 and the like when the inner yokes 43 and 43' and four terminal pins 6A, 6B, 6C and 6D are held by the slide dies 301 and 302 and the like.

In this case, the slide dies 301 and 302 permit the flange parts 431 and 431' of the inner yokes 43 and 43' to be inserted into the holding part 302b and the flange parts 431 and 431' are held in the positioned state in the holding part 302b as shown in FIG. 5. In other words, the flange parts 431 and 431' of the inner yokes 43 and 43' are entered into the second groove 302a(2) and thus their outer peripheral edges are held by the holding part 302b and their inner side portions of the outer peripheral edges are located in the semicircular cavities.

Next, the upper die 303 is closed. In this manner, an upper face opening of the cavity is closed together with the slide dies 301 and 302 to form the cavity for injecting synthetic resin (specifically, synthetic resin in a molten state) into the molding dies in a completely closed state.

After that, synthetic resin is injected into the cavity through a gate. The inner yokes 43 and 43' and four terminals 6A, 6B, 6C and 6D are integrated with each other with the synthetic resin as combining material. In other words, portions between the respective pole teeth 42 and 42A and the outer peripheral sides of the pole teeth 42 and 42A of the inner yokes 43 and 43' are completely injected and surrounded by the synthetic resin to form the drum parts 100 and 100'. Moreover, the synthetic resin is injected into the respective semicircular cavities of the respective grooves 302a. As a result, the flange parts 431 and 431' are covered by the synthetic resin to respectively form the flange parts 2 and 2' on the upper and lower sides of the drum parts 100 and 100'. Further, the parallel flat face 101 is formed on the portions corresponding to the molding die flat faces 3011 and 3021.

Further, after the synthetic resin injected into the cavity has hardened, the upper die 303 is opened and then the slide dies 301 and 302 are opened to be released in a reverse order to the die closing time.

When a molded product is released from the molding dies 301 through 304, the coil member 45 connected by the connection member 40 is formed as the plate assembly. Finally, the coil member 45 is cut off from the plate assembly to obtain the coil member 45 as a separate member. In this case, in order to perform cutting work of connecting parts 402 which are formed to connect the coil member 45 with the plate 401, it is preferable to form positioning parts 50 as shown in FIG. 2.

The coils 46 and 46' are wound around the drum parts 100 and 100' of the coil member 45 which is formed as described above. In this case, it is important that the coils 46 and 46' are wound along the outer peripheral faces of the drum parts 100 and 100' in a circular shape. Therefore, the innermost coils 46 and 46' are also wound along the outer peripheral faces of the drum parts 100 and 100' in the circular shape and thus a space part 130 (see FIG. 7) is formed between the parallel flat face 101 and the innermost coils 46 and 46' based on the length in the circumferential direction of the parallel flat face 101. Accordingly, in accordance with this embodiment, as shown in FIG. 7, even when a burr 120 is formed along the joining part 400, a space part 130 is formed between the parallel flat face 101 and the innermost coils 46 and 46' and, as a result, when lengths of the widths "Y" and "Y'" of the parallel flat face 101 are appropriately predetermined, the burr 120 can be accommodated within the space part 130 and thus the burr 120 does not contact with the innermost coils 46 and 46'.

As described above, in the coil member 45 in accordance with this embodiment, the joining part 400 is formed along the axial direction on the outer peripheral faces of the drum parts 100 and 100'. The joining part 400 is formed on the parallel flat face 101 which is formed in parallel with the separating directions of the slide dies 301 and 302 so that the drum parts 100 and 100' do not interfere with the slide dies 301 and 302 when the slide dies 301 and 302 are separated. According to the structure as described above, when the coil member 45 is released from the slide dies 301 and 302, the coil member 45 can be prevented from being damaged by the slide dies 301 and 302.

Further, the parallel flat face 101 is formed to be parallel to the directions of the arrows "X" and "X'" in FIG. 2, and the joining part 400 is set at the position where the lengths of the widths "Y" and "Y'" in the separate directions of the slide dies 301 and 302 are equal to each other. Therefore, a separated distance from the burr formed on the parallel flat face 101 to the coil can be made larger. Accordingly, disconnection or damage of the coil by the burr can be securely prevented.

Further, the parallel flat faces 101 are formed at point symmetrical positions in the direction perpendicular to the axial direction and the joining parts 400 are formed on the parallel flat faces 101. According to the structure as described above, disconnection or damage of the coil by the burr which is continuously formed between one end face and the other end face of the coil member can be prevented.

Further, the joining part 400 is formed at a substantially center position of the parallel flat face 101 in the separated directions of the slide dies 301 and 302. Therefore, even when the burr 120 is formed along the joining part 400, a distance from a tip end of the burr 120 to the coils 46 and 46' can be made larger in comparison with a case where the position of the joining part 400 is shifted to one end side from the substantially center position of the parallel flat face 101.

Further, even when the pole teeth 42 and 42A of the inner yokes 43 and 43' which are integrally molded on the inner sides of the drum parts 100 and 100' are disposed on the inner side in the radial direction of the joining part 400 (see the pole tooth 420 in FIG. 2), according to this embodiment, the slide dies 301 and 302 are moved in the reverse direction of 180°, in other words, in the directions of "X" and "X'" to release the coil member 45. Therefore, the slide dies 301 and 302 do not press the pole teeth 42 and 42' to the inner side and thus the pole teeth 42 and 42' can be disposed on the inner side in the radial direction of the joining part 400. Accordingly, the pole teeth can be disposed to overlap the burr in the radial direction and thus a degree of freedom for design of a pole teeth arrangement is improved.

The present invention is not limited to the embodiments described above, and many modifications can be made without departing from the subject matter of the present invention.

For example, in the embodiment described above, the molding die flat faces 3011 and 3021 form the parallel flat face 101 which is formed in parallel with the separating directions of the slide dies 301 and 302 (directions of the arrow "X" and "X'") on the outer peripheral faces of the drum parts 100 and 100' so that the drum parts 100 and 100' are not pressed by the slide dies 301 and 302 over the region that the slide dies 301 and 302 and the drum parts 100 and 100' slide with each other when the molding dies 301 and 302 are separated in the directions shown by the arrows "X" and "X'" in FIG. 4. However, the present invention may be applied to a case that the drum parts 100 and 100' are not pressed by the slide dies 301 and 302 when the molding dies 301 and 302 are separated in the directions shown by the arrows "X" and "X'" in FIG. 4. Therefore, the flat face parts formed on the outer peripheral faces 102 and 102' of the drum parts 100 and 100' are not required to be parallel with the separating directions of the slide dies 301 and 302 (directions of the arrows "X" and "X'"). For example, the flat face parts formed on the outer peripheral faces 102 and 102' of the drum parts 100 and 100' may be inclined such that the joining part of the slide dies 301 and 302 is located at a slightly outer position in comparison with the parallel flat face 101.

Further, the inner yoke 43' may not be included in the coil member 45 with integral molding. In other words, the coil member 45 may be structured of a cylindrical drum part 100 in which the coil 46 is to be wound around its outer peripheral face, the ring-shaped flange parts 2 which are protrudingly formed over the entire periphery in the circumferential direction from both end portions in the axial direction of the drum part 100, the inner yoke 43 having the pole teeth 42 which is integrally formed in the drum part 100 by insert-molding, and the terminal block 6 which is integrally formed at the outer peripheral edge of the flange part 431 of the inner yoke 43.

Further, the inner yoke 43 having the pole teeth 42 may be structured as a separate member from the coil member 45. In other words, the inner yoke 43 is not required to be integrally formed in the drum part 100 by insert-molding. In this case, the coil member 45 is formed as a simple coil bobbin.

In the embodiment described above, the coil member 45 is integrally formed by using the slide dies 301 and 302 and the upper die 303 and the lower die 304. However, a structure of the molding dies for forming the coil member 45 is not limited to this embodiment. For example, in the embodiment described above, two slide dies 301 and 302 are utilized but three or more slide dies may be used to integrally form the coil member 45. Further, in the embodiment described above, one upper die 303 is utilized but two or more upper dies may be used to integrally form the coil member 45.

In the embodiment described above, the present invention is applied to a stepping motor. However, the present invention may be applied to a coil member used in other types of device in addition to other types of motor such as a HB motor or a brushless DC motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A coil member comprises:
   a cylindrical drum part in which a coil is to be wound around an outer peripheral face of the cylindrical drum part in a circular shape and which is formed by two molding dies movable in a direction perpendicular to an axial direction along the cylindrical drum part;
   a flat face part which is formed on an inner side from the outer peripheral face so that a space part is formed between an innermost circumferential face of the coil which is to be wound around the outer peripheral face in the circular shape and the flat face part, and the flat face part being formed so that the two molding dies are separated without pressing the outer peripheral face of the cylindrical drum part; and
   a joining part on the drum part which is formed by the two molding dies and is located on the flat face part;
   wherein the flat face part is a parallel flat face part which is formed in parallel with separating directions of the two molding dies.

2. The coil member according to claim 1, wherein a length in a circumferential direction of the flat face part is set to be a length so that a burr formed at the joining part does not contact with the innermost circumferential face of the coil which is to be wound around the outer peripheral face of the cylindrical drum part in the circular shape.

3. The coil member according to claim 2, further comprising a pair of ring-shaped flange parts which is protrudingly formed in a radial direction from both end portions in an axial direction of the drum part;
   wherein a space which is formed between the pair of the flange parts is used as a coil winding part around which the coil is to be wound in the circular shape; and
   wherein the flat face part is formed on an entire region between the flange parts in the axial direction of the drum part.

4. The coil member according to claim 2, wherein the outer peripheral face of the cylindrical drum part is formed with two flat face parts formed across a center of the cylindrical drum part.

5. The coil member according to claim 1, further comprising a stator core having pole teeth which is integrally formed in the drum part by insert molding.

6. The coil member according to claim 5, wherein inner peripheral faces of the pole teeth are exposed from an inner peripheral face of the drum part.

7. The coil member according to claim 6, wherein one of the pole teeth is located at a position so as to overlap with the joining part in a radial direction of the drum part.

8. The coil member according to claim 1, wherein the joining part is located at a substantially center position on the flat face part in separating directions of the two molding dies.

9. A coil member comprising:
   a cylindrical drum part in which a coil is to be wound around an outer peripheral face of the cylindrical drum part in a circular shape and which is formed by two molding dies movable in a direction perpendicular to an axial direction along the cylindrical drum part;
   a flat face part which is formed on an inner side from the outer peripheral face so that a space part is formed between an innermost circumferential face of the coil which is to be wound around the outer peripheral face in the circular shape and the flat face part, and the flat face part being formed so that the two molding dies are separated without pressing the outer peripheral face of the cylindrical drum part; and
   a joining part on the drum part which is formed by the two molding dies and is located on the flat face part;
   wherein the flat face part is formed at least a pair of point-symmetrical positions in a direction perpendicular to an axial line direction of the drum part with respect to a center of the drum part.

10. A motor comprising:
    a coil member having a cylindrical drum part;
    a coil which is wound around an outer peripheral face of the cylindrical drum part of the coil member in a circular shape;
    a stator having a stator assembly provided with the coil member and the coil; and
    a rotor having a rotor magnet which is disposed on an inner side of the drum part;
    wherein the cylindrical drum part of the coil member is formed by two molding dies movable in a direction perpendicular to an axial direction along the cylindrical drum part;
    wherein the cylindrical drum part is formed with a flat face part which is formed on an outer peripheral face so that a space part is formed between an innermost circumferential face of the coil in the circular shape and the flat face part, and the flat face part being formed so that the two molding dies are separated without pressing the outer peripheral face of the cylindrical drum part;
    wherein a joining part on the drum part which is formed by the two molding dies is located on the flat face part;
    wherein a burr which is formed at the joining part on the flat face part of the drum part is accommodated in the space without contacting with the innermost circumferential face of the coil; and wherein the flat face part is a parallel flat face part which is formed in parallel with separating directions of the two molding dies.

11. The motor according to claim 10, further comprising an inner yoke for structuring the stator assembly having pole teeth which are integrally molded on an inner peripheral side of the drum part by insert-molding; and an outer yoke for structuring the stator assembly having pole teeth which are inserted into recessed parts recessed from the inner peripheral face of the drum part in a radial direction;

wherein the pole teeth of the inner yoke and the pole teeth of the outer yoke are alternately and adjacently disposed in the axial direction on the inner peripheral side of the drum part.

12. The motor according to claim 11, wherein the pole teeth of the inner yoke and the pole teeth of the outer yoke are disposed to face the rotor magnet in a state that inner peripheral faces of the pole teeth are exposed from the inner wall of the drum part.

13. The motor according to claim 12, wherein outer peripheral faces and side faces of the pole teeth of the inner yoke and the pole teeth of the outer yoke are covered with the drum part.

14. The motor according to claim 10, wherein a length in a circumferential direction of the flat face part is set to be a length so that a burr formed at the joining part does not contact with the innermost circumferential face of the coil which is wound around the outer peripheral face of the cylindrical drum part in the circular shape.

15. The motor according to claim 14, further comprising a pair of ring-shaped flange parts which is protrudingly formed in a radial direction from both end portions in an axial direction of the drum part;

wherein a space which is formed between the pair of the flange parts is used as a coil winding part around which the coil is to be wound in the circular shape; and wherein the flat face part is formed on an entire region between the flange parts in the axial direction of the drum part.

* * * * *